United States Patent [19]
Meissinger

[11] 3,862,528
[45] Jan. 28, 1975

[54] DEPLOYABLE BOOM

[75] Inventor: Hans F. Meissinger, Los Angeles, Calif.

[73] Assignee: TRW Inc., Redondo Beach, Calif.

[22] Filed: June 23, 1972

[21] Appl. No.: 265,524

Related U.S. Application Data

[63] Continuation-in-part of Ser. No. 34,311, May 4, 1970, abandoned.

[52] U.S. Cl. ............................... 52/108, 242/54 A
[51] Int. Cl. ............................................. E04h 12/16
[58] Field of Search ...................... 52/108, 730, 734; 242/54 A, 84.8

[56] References Cited
UNITED STATES PATENTS

| | | | |
|---|---|---|---|
| 2,352,526 | 6/1944 | Farrand | 52/108 |
| 2,774,386 | 12/1956 | Formenti | 52/730 |
| 3,144,215 | 8/1964 | Klein | 52/108 |
| 3,298,142 | 1/1967 | Isaac | 52/108 |
| 3,434,254 | 3/1969 | Rubin | 52/108 |
| 3,499,610 | 3/1970 | Leonard | 52/108 |
| 3,528,543 | 9/1970 | Robinski | 52/108 |
| 3,696,568 | 10/1972 | Berry | 52/108 |

*Primary Examiner*—Henry C. Sutherland
*Attorney, Agent, or Firm*—Daniel T. Anderson; Donald R. Nyhagen; Jerry A. Dinardo

[57] ABSTRACT

A deployable extendible boom formed of a resilient strip having longitudinal corrugations wherein the corrugations are preformed on the resilient strip. The boom is stored on a cylindrical drum with the corrugations flattened. When the boom is unwound for deployment, the boom assumes its unrestrained condition which forms a resilient strip having longitudinal corrugations.

1 Claim, 8 Drawing Figures

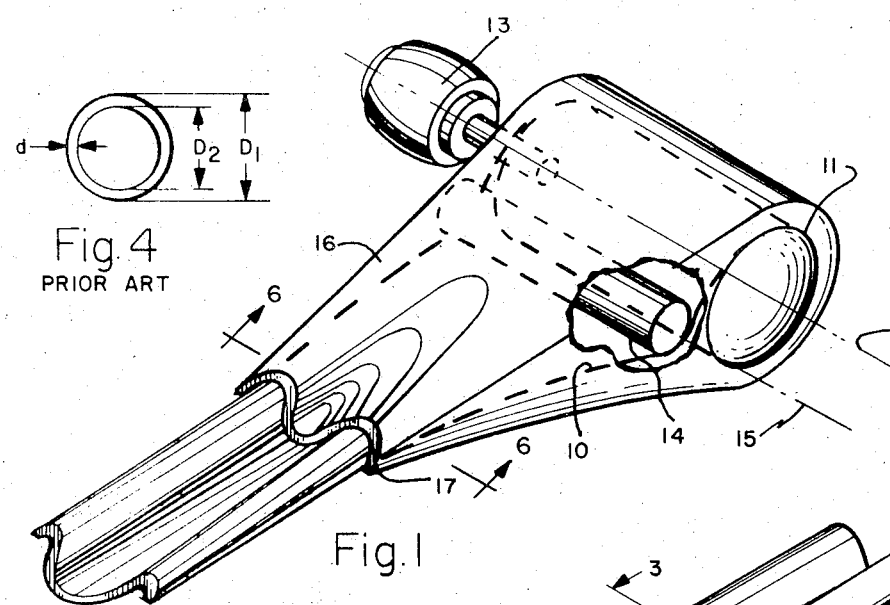
Fig. 4 PRIOR ART
Fig. 1
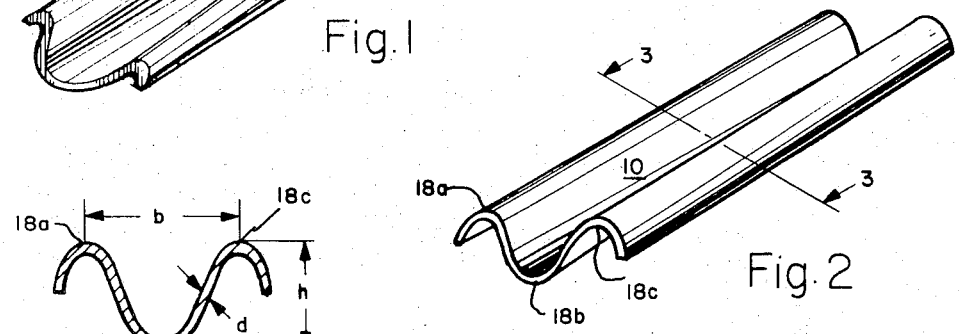
Fig. 2
Fig. 3
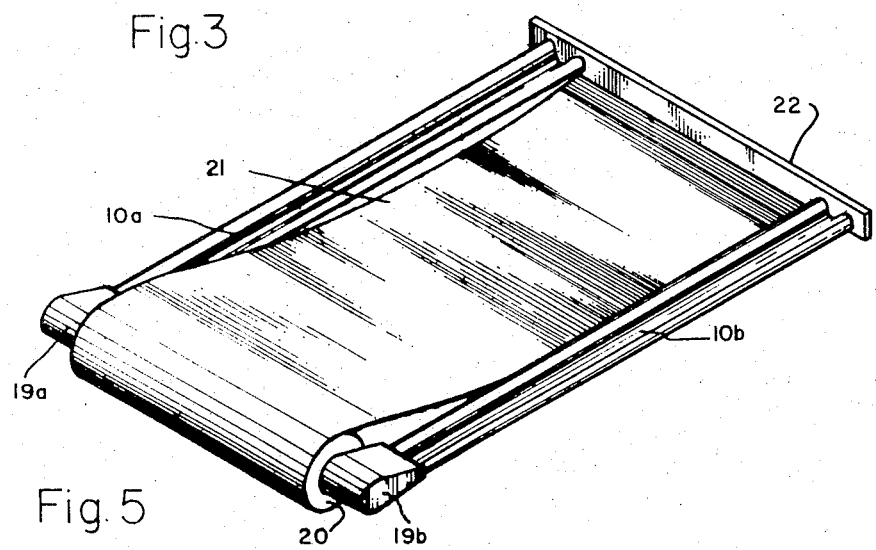
Fig. 5

PATENTED JAN 28 1975 3,862,528
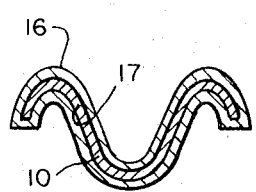
Fig. 6
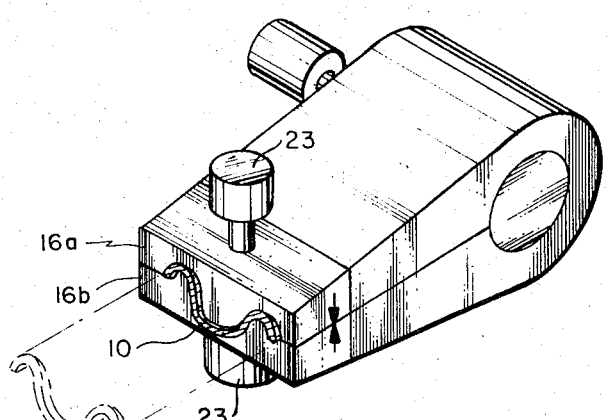
Fig. 7
Fig. 8
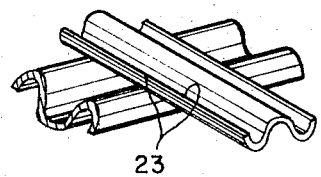

DEPLOYABLE BOOM

RELATED APPLICATIONS

This application is a continuation-in-part of copending application Ser. No. 34,311, filed May 4, 1970 and which is now abandoned.

BACKGROUND OF THE INVENTION

Spacecraft are typically provided with one or more solar cell arrays for providing electrical power to operate the on-board equipment. Solar arrays are either of the fixed type or deployable type.

A fixed array is one in which the solar cells are mounted on fixed panels, or the like, rigidly secured to the body of the spacecraft. A deployable array remains in a retracted position during launch and is then deployed when the spacecraft achieves orbit. Deployable arrays are generally preferred over fixed arrays when a large effective area and greater power output is required.

A variety of different schemes have been devised which seek to solve the problem of deploying a solar array. At the heart of any deployable solar array is the extendible boom which is used to erect the stowed solar cell sheets, or panels, and support them in deployed configuration.

The deployable boom and array of this invention is an improvement over prior art booms. One type of extendible boom presently utilized comprises a single strip of narrow flat tape which is initially wound around a drum or spool in a stressed condition. When the boom is deployed, the tape is unwound from the drum and allowed to assume its unconstrained condition, thus forming a tube with overlapping edges. In this type of boom, there is a tendency for severe thermal deformation to occur. To solve the thermal deformation problem, perforations are made in the boom. However, the perforations weaken the boom structurally. Coilable booms are illustrated in U.S. Pat. No. 3,144,104 to Wier et al., U.S. Pat. No. 3,144,215 to Klein, and U.S. Pat. No. 3,177,987 to Swaim.

Another type of deployable boom is shown in U.S. Pat. No. 3,434,254 to C. P. Rubin which discloses a longitudinally flexible, hollow, thin-walled tubular structure including a pair of strips of thin material having welded edges and bowed center sections. The bowed center sections are compressed transversely toward one another to form a flat tape configuration of double material thickness when rolled onto a storage drum. Upon deployment, the walls relax to their original bowed configuration forming a hollow tubular boom with opposite flat planar margins. This closed-profile boom also is susceptible to thermal stress problems.

The above-described booms also suffer the disadvantage of requiring additional boom material to provide for the overlapping needed for structural rigidity.

It is highly desirable, especially because of the limited space and weight allowances in space vehicles, to provide a boom which is as light in weight and as small in size as is possible for a given desired rigidity.

SUMMARY OF THE INVENTION

In accordance with an example of a preferred embodiment of the present invention, a light-weight deployable boom comprises a resilient strip which is preformed to an open or non-tubular corrugated cross-section with corrugations running lengthwise of the strip. The boom is stored on a rotatable drum during launch. As the boom is wound on the drum, the resilient strip passes around a roller adjacent to the drum to flatten the strip. After launch, the boom is deployed by extending the strip through a deployment horn with a boom exit opening having a corrugated cross-section in a plane normal to the longitudinal axis of the opening matching the solid corrugated cross-section of the strip. The deployed boom thus assumes its normal unstressed corrugated shape having longitudinal corrugations.

A principal advantage of the present boom over prior art designs is its open non-tubular cross-section which undergoes a relatively small deformation when changing from the stowed to the deployed configuration, has reduced susceptibility to thermal deformation in the deployed condition and facilitates joining of two crossing booms by fasteners, welds, or the like. This open non-tubular cross-section of the strip also permits the exit opening of the deployment horn to have a corrugated cross-section matching the solid corrugated cross-section of the strip and thus reinforce the strip against bending. A feature of the invention in this regard resides in a novel deployment horn which is split along a parting plane containing the longitudinal axis of the exit opening and provided with clamping means for urging the two halves of the horn together to firmly clamp the boom strip. This clamping action further reinforces the strip against bending.

BRIEF DESCRIPTION OF THE DRAWINGS

FIG. 1 is a perspective view of an example of the deployment means according to the invention;

FIG. 2 is an isometric view of a preferred embodiment of a boom according to the invention;

FIG. 3 is a cross-sectional view of a preferred embodiment of a boom according to the invention taken along axis 3—3 of FIG. 2;

FIG. 4 is a cross-sectional view of a prior art tubular boom;

FIG. 5 is a perspective view of a deployed solar cell array according to the invention;

FIG. 6 is an enlarged section taken on line 6—6 in FIG. 1;

FIG. 7 is a perspective view of a modified deployment means with a split deployment horn for clamping the boom strip; and FIG. 8 illustrates the manner in which two booms of the invention may be joined.

DESCRIPTION OF THE PREFERRED EMBODIMENTS

FIG. 1 shows a perspective view of an example of a deployment means according to the invention. A corrugated resilient strip 10, which may be formed of metal such as tempered steel or beryllium copper is shown being deployed from a storage drum 11. Storage drum 11 rotates about an axis 12. Storage drum 11 may be rotated in either direction by an electric motor 13 for deployment or retraction of the boom.

A compression roller 14, which rotates about an axis 15, is located adjacent to storage drum 11. During retraction, as resilient strip 10 passes between drum 11 and roller 14 it is flattened. For retraction, drum 11 is driven in a clockwise direction, and compression roller 14 rotates in a counter-clockwise direction.

For deployment, the electric motor drives storage drum 11 in a counter-clockwise direction thus forcing strip 10 to unwind from the drum past roller 14 and through a deployment horn 16. Deployment horn 16 surrounds roller 14 and drum 11. Deployment horn 16 has an exit opening 17 through which the strip 10 emerges from the horn. This opening has a corrugated cross-section matching the solid corrugated cross-section of the strip and aids restoration of the strip to its preformed corrugated cross-section as the strip deploys.

Strip 10 is initially preformed to its corrugated cross-section of FIG. 2, typically including two outer corrugations 18a, 18c at one side of the strip and a third central corrugation 18b at the other. For higher bending strength, a cross-section having a greater number of corrugations may be used. The corrugations are prestressed into the material during the manufacturing process.

When strip 10 is stored on drum 11, it can be seen that the corrugations will flatten. Upon deployment of the strip through horn 16, the corrugations will reform as the strip passes through corrugated exit opening 17 in the horn.

Referring to the cross-section geometry of the strip 10, as shown in FIG. 3, the ratio of inertia J to cross-section area F is as follows. Let $b$ = cap-to-cap distance, $d$ = thickness of metal sheet, and $h$ = height of the corrugations. Assume $c = 4h/b = 1$. Then $$P_1 = \frac{J_1}{F_1} \cong \frac{20\ dh^2 \left[1 + \frac{c^2}{14} - \frac{c^4}{168}\right]}{150\ d \left[1 + \frac{c^2}{6} + \frac{c^2}{40}\right]} \approx .122h^2$$

It can therefore be seen that the strength of the boom increases proportionately to the square of the height of the corrugations.

FIG. 4 shows a prior art tubular boom, for which the ratio of inertia J to cross-section area F is as follows. Let $d$ = thickness of tube, $D_1$ = outside diameter, and $D_2 = D_1 - 2d$ = inside diameter.

$P_2 = J_2/F_2 \cong [0.05\ (D_1^4 - D_2^4)]/(\pi\ d\ D_1) \approx (0.4/\pi) D_1^2 = 0.127 D_1^2$ If the corrugation height h equals the diameter $D_1$ of the circular cross-section, it can be seen that the stiffness ratio $P_2$ of the tubular boom is only four percent greater than the ratio $P_1$ of the corrugated boom.

The aforementioned advantages of a corrugated boom, therefore, outweigh the four percent penalty paid by a corrugated boom of equivalent size.

A solar array support structure utilizing twin booms according to the invention is shown in FIG. 5. Boom storage housings 19a and 19b are provided, and an additional housing 20, holds a flexible solar array 21 which is fastened at one end to tie bar 22 which connects the outboard ends of twin booms 10a and 10b. Corrugated booms 10a and 10b are shown in the deployed condition. Tie bar 22 provides enhanced structural rigidity to the array, and helps to support booms 10a and 10b against torsional loads. Therefore, the principal loads acting on booms 10a and 10b are bending and shear loads rather than torsional loads.

The system of FIG. 5 may be fastened to the side of a spacecraft. Prior to launch of the spacecraft, booms 10a and 10b are retracted into housings 19a and 19b, respectively. Flexible solar array 21 is wound on a storage drum located within housing 20. After launch, booms 10a and 10b are unwound from their respective storage drums for deployment. Tie bar 22 pulls out solar array 21 from housing 20 in the same manner as a window shade is pulled down.

The solar cells mounted on flexible solar array 21 may be any commercially available solar cell including silicon and cadmium sulfide (thin-film) type. The solar cells may be joined edge-to-edge and mounted on a plastic substrate.

The boom of the present invention, with its open corrugated cross-section, has many advantages over prior art booms with the closed tubular cross-section of FIG. 4. The corrugated boom, for example, is much less subject to thermal distortion in the form of bending than is the tubular beam. This is due to the fact that thermal radiation entering one side of the corrugated boom is conducted through the boom and radiates from the opposite side of the boom so that both sides of the boom remain at the same temperature during exposure of the boom to thermal cycles, such as may be encountered in outer space. This is not true of a boom with a closed tubular cross-section, since the side of the boom exposed to the radiation source tends to be heated more than the opposite shaded side of the boom. As a consequence, the boom tends to distort or bend when exposed to thermal cycling.

Another advantage of the present corrugated boom resides in the fact that the deployment horn 16 may be designed to reinforce the boom against bending against the horn much more effectively than may the deployment horn for a closed tubular beam. In this regard, attention is directed to FIG. 6, wherein it will be observed that the exit opening 17 of the horn matches the solid corrugated cross-section of the boom. Accordingly, one wall of the opening engages one corrugated surface of the boom strip 10 and the opposite wall of the opening engages the opposite surface of the strip with only the solid cross-section of the strip located between the walls. The contact of the exit opening walls with the opposite strip surfaces obviously reinforces the strip against bending for some distance from the deployment horn. Moreover, as shown in FIG. 7, the exit end of the deployment horn may be split into two halves 16a, 16b along a parting plane containing the longitudinal axis of the horn exit opening, and clamping means 23, such as hydraulic cylinders, may be provided for urging the two halves together to firmly clamp therebetween the boom strip 10 and thereby more effectively reinforce the strip against bending.

A boom with the closed tubular cross-section of FIG. 4 cannot be reinforced against bending in either of these two ways. Thus, the exit opening in the deployment horn for such a tubular boom matches the outer tubular profile of the boom strip and not the solid cross-section of the boom strip itself. The wall of the opening engages only the outer surface of the tubular strip and not both the inner and outer surfaces of the strip. As a consequence, there is no internal support to resist inward collapsing of the boom under bending loads. Moreover, the tubular boom may not be clamped in a manner similar to that illustrated in FIG.

7 to reinforce the boom against bending, since the tubular boom would merely collapse inwardly.

FIG. 8 illustrates another advantage of the present corrugated boom. In this case, two of the boom strips 10 are disposed in overlapping relation with their corrugation caps or crests 18a, 18c in seating contact. These contacting crests are joined by fasteners or welds 23.

What is claimed as new in support of Letters Patent is:

1. A deployable boom device comprising:
   a rotary cylindrical drum;
   a deployable boom including a single resilient strip only of substantially uniform thickness and open corrugated cross-section, said strip being flattened and fixed at one end to said drum and having preformed longitudinally extending corrugations whose surfaces are totally exposed and accessible at opposite sides of the strip and longitudinal edges located laterally outboard of said corrugations;
   means for rotating said drum to wind said strip in flat condition on said drum for storage and unwind said strip from said drum for deployment;
   a deployment horn enclosing said drum and having an exit opening through which said strip passes, said opening having a corrugated cross-section matching the solid corrugated cross-section of the strip and being defined by spaced, parallel corrugated side boundary walls complementing the corrugated surfaces of the strip, and a uniform width measured between said boundry walls approximating said uniform thickness of said strip, said corrugated boundry walls engaging said corrugated surfaces of said strip for reforming said strip to its corrugated configuration and reinforcing said strip as it deploys through said openings;
   said horn including separable sections having confronting parting surfaces, portions of which parting surfaces constitute said side boundary walls; and
   clamping means for urging said horn sections together to firmly clamp said strip between said boundary walls.

* * * * *